United States Patent
Roberts (10) Patent No.: US 8,946,958 B2
(45) Date of Patent: Feb. 3, 2015

(54) ENERGY STORAGE SYSTEM COMPRISING A FLYWHEEL

(75) Inventor: Michael John Roberts, Jamberoo (AU)

(73) Assignee: Empire Technology Development LLC, Wilmington, DE (US)

( * ) Notice: Subject to any disclaimer, the term of this patent is extended or adjusted under 35 U.S.C. 154(b) by 447 days.

(21) Appl. No.: 13/321,784

(22) PCT Filed: May 13, 2011

(86) PCT No.: PCT/AU2011/000553
§ 371 (c)(1),
(2), (4) Date: Nov. 21, 2011

(87) PCT Pub. No.: WO2012/155170
PCT Pub. Date: Nov. 22, 2012

(65) Prior Publication Data
US 2012/0060645 A1  Mar. 15, 2012

(51) Int. Cl.
*H02K 7/02* (2006.01)
*H02K 7/09* (2006.01)
*E02F 9/28* (2006.01)

(52) U.S. Cl.
CPC ............. *E02F 9/2841* (2013.01); *E02F 9/2825* (2013.01)
USPC ....... 310/74; 310/90.5; 74/572.11; 74/572.12

(58) Field of Classification Search
CPC ........... H02K 1/27; H02K 7/025; F16C 32/04
USPC .................. 310/74, 90.5; 74/572.11, 572.12
See application file for complete search history.

(56) References Cited

U.S. PATENT DOCUMENTS

| 3,258,623 A | * | 6/1966 | Phelon et al. ............ 310/156.31 |
| 5,012,694 A | | 5/1991 | McGrath |
| 5,214,981 A | | 6/1993 | Weinberger et al. |
| 5,760,506 A | | 6/1998 | Ahlstrom et al. |
| 5,905,321 A | * | 5/1999 | Clifton et al. ................. 310/178 |
| 6,153,958 A | | 11/2000 | Hull et al. |

(Continued)

FOREIGN PATENT DOCUMENTS

| CA | 2327492 A1 | 5/2002 |
| DE | 2544261 A  * | 4/1977 |

(Continued)

OTHER PUBLICATIONS

Machine Translation DE2544261 (1977) FR2614367 (1988) and FR0017724 (1980).*

(Continued)

*Primary Examiner* — Tran Nguyen
*Assistant Examiner* — Jose Gonzalez Quinones
(74) *Attorney, Agent, or Firm* — Amin, Turocy & Watson, LLP (57) ABSTRACT

An energy storage system is generally disclosed. An example system includes a flywheel having a substantially cylindrical flywheel portion, and a housing defining a substantially cylindrical cavity configured so as to receive the substantially cylindrical flywheel portion. The flywheel is rotatable in the cavity about a central axis of the flywheel, and an energy exchange device is configured to convert between electrical energy and kinetic energy associated with rotation of the flywheel. The system may also have a magnetic restraint arranged to exert a magnetic restraining force on the flywheel in a direction towards the central axis.

28 Claims, 7 Drawing Sheets

(56) References Cited

U.S. PATENT DOCUMENTS 6,262,505 B1 * 7/2001 Hockney et al. ............. 310/90.5
6,825,588 B2   11/2004 Gabrys et al.

FOREIGN PATENT DOCUMENTS

| | | | |
|---|---|---|---|
| DE | 2544261 | A1 | 4/1977 |
| EP | 17724 | A * | 10/1980 |
| EP | 0017724 | A1 | 10/1980 |
| FR | 2614367 | A1 * | 10/1988 |
| GB | 2297870 | A | 8/1996 |

OTHER PUBLICATIONS

"Federal Energy Management Program" http://www1.eere.energy.gov/femp/pdfs/fta_flywheel.pdf, Sep. 5, 2003.

John G, "Global Solar Photovoltaic Market Analysis and Forecasts to 2020", PR Log—Global Press Release Distribution, Mar. 13, 2009, 3 pages.

"New Solar Cells Break 40% Efficiency Barrier", RenewableEnergyWorld.com, 2 pages, Dec. 7, 2006.

Fuji Keizai, "Global Market: Current & Next Generation Solar Cell & Related Material Market Outlooks (Japanese Version)", 2 pages, Mar. 14, 2007.

"Pentadyne: Clean Energy Storage" http://www.pentadyne.com/uploads/18/File/Pentadyne-VSS-Brochure.pdf, 4 pages, May 7, 2009.

"Flywheel" http://en.wikipedia.org/wiki/Flywheel. 3 pages, Jul. 12-15, 2012.

http://en.wikipedia.org/wiki/Flywheel_energy_storage, Mar. 6, 2012.

Vere, "A primer of flywheel technology", 7 pages, Apr. 30, 2007.

"Fact Sheet—Frequency Regulation and Flywheels", 2 pages, Oct. 11, 2012.

International Search Report and Written Opinion mailed Aug. 7, 2011 for International Application No. PCT/AU2011/000553, 11 pages.

* cited by examiner

ENERGY STORAGE SYSTEM COMPRISING A FLYWHEEL

RELATED APPLICATION

The subject application is a US national stage application of PCT Application Serial No. PCT/AU2011/000553, filed May 13, 2011, and entitled "Energy Storage System," the disclosure of which is incorporated herein by reference in its entirety.

BACKGROUND

Unless otherwise indicated herein, the materials described in this section are not prior art to the claims in this application and are not admitted to be prior art by inclusion in this section.

A flywheel can be used to store energy by converting the energy to be stored into kinetic energy associated with a rotating flywheel. Energy may subsequently be extracted from the storage system by converting the kinetic energy in the flywheel to electrical energy using a generator.

The amount of energy stored in a flywheel is dependent, among other things, on the speed of rotation of the flywheel. The present disclosure appreciates that at very high speeds the force required to hold the flywheel together may become prohibitively high.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

In some embodiments, an energy storage system is generally described. An example system includes a flywheel having a flywheel portion, and a housing defining a cavity configured so as to receive the flywheel portion with the flywheel being rotatable in the cavity about a central axis of the flywheel. The system may also have an energy exchange device arranged to convert between electrical energy and kinetic energy associated with rotation of the flywheel, and/or a magnetic restraint arranged to exert a magnetic restraining force on the flywheel in a direction towards the central axis.

BRIEF DESCRIPTION OF THE DRAWINGS

In the drawings

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, and devices related to energy storage with flywheels.

Briefly stated, an energy storage system is generally disclosed. An example system includes a flywheel having a flywheel portion, and a housing defining a cavity configured so as to receive the flywheel portion. The flywheel is rotatable in the cavity about a central axis of the flywheel, and an energy exchange device is provided configured to convert between electrical energy and kinetic energy associated with rotation of the flywheel. The system may also have a magnetic restraint arranged to exert a magnetic restraining force on the flywheel in a direction towards the central axis.

Figure 1:
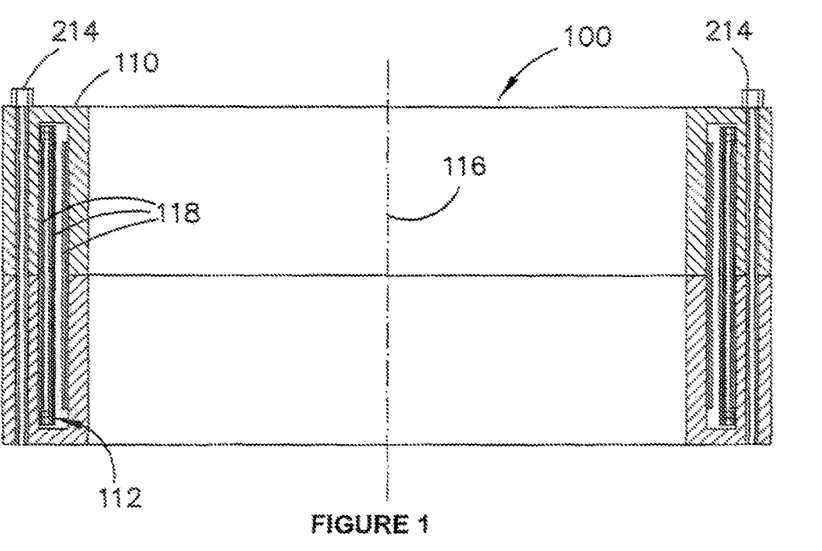
FIG. 1 is a diagrammatic cross-sectional representation of an example of an energy storage system.

FIG. 1 is a diagrammatic cross-sectional representation of an example of an energy storage system 100 that is arranged according to at least some embodiments described herein.

The example energy storage system 100 includes a housing 110, and a flywheel 112 of generally cylindrical shape. In some embodiments, the housing 110 has a generally annular shape. The housing 110 includes a generally cylindrical cavity that is configured to receive the flywheel 112. The cavity 114 and the flywheel 112 are configured in cooperation such that the flywheel 112 is rotatable in the cavity 114 about a central axis 116.

The example energy storage system 100 also may include a magnetic restraint 118 associated with the flywheel 112 and the cavity 114. The magnetic restraint 118 can be configured so that a magnetic restraining force can be exerted on the flywheel 112 in a direction towards the central axis 116. The magnetic restraining force can be utilized to offset centripetal forces exerted on the flywheel during rotation of the flywheel and in so doing may enable the flywheel to rotate at a higher speed than would otherwise be possible without the magnetic restraining force. As a consequence, the energy storage capacity of the flywheel may be increased compared to similar sized conventional flywheels.

For example, in Germany, FZK's Institut für Technische Physik (INFP) built and tested a small flywheel model using superconducting bearings combined with permanent magnets. The flywheel system uses disks constructed from advanced carbon fibers. It produced a peak power of 10 kVA, 300 Wh.

Figure 2:
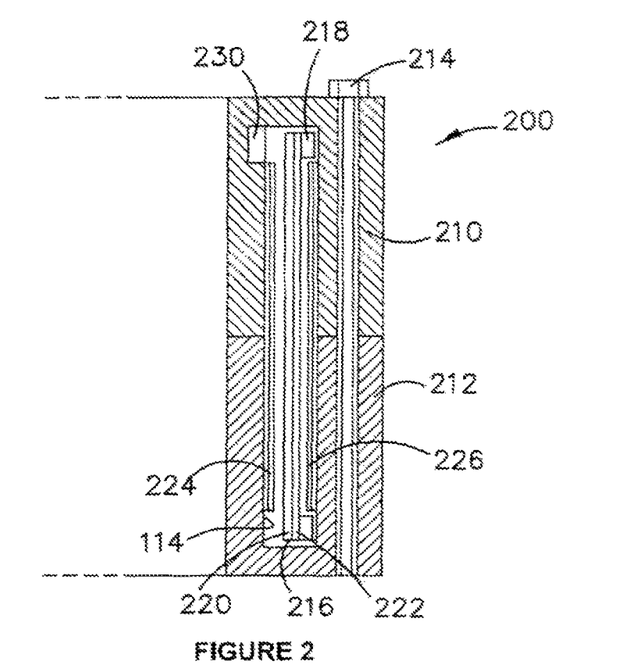
FIG. 2 is a diagrammatic cross-sectional enlarged view of part of the energy storage system shown in FIG. 1.

The energy storage system 100 may also include an energy exchange device 230 arranged to convert between electrical energy and kinetic energy associated with rotation of the flywheel 112. In this example, the energy exchange device 230 may include a static homopolar winding. FIG. 2 is a diagrammatic cross-sectional enlarged view of part of the energy storage system shown in FIG. 1, arranged according to at least some embodiments described herein. As shown more particularly in the enlarged view 200 of FIG. 2, the housing 110 in this example has a first housing portion 210 and a second housing portion 212 that are coupled together, for example using bolts 214, so as to define the substantially cylindrical cavity 114 and facilitate reception of the flywheel 112 in the cavity 114. The first and second housing portions 210, 212 can also be configured such that the cavity 114 is substantially sealed to the extent that a low pressure environment can be sustained in the cavity 114. In this example, the environment in the cavity 114 is a substantial vacuum.

In some examples, the magnetic restraint 118 includes a flywheel magnetic restraint 216 associated with the flywheel 112 and a cavity magnetic restraint 224, 226 associated with the cavity. The flywheel magnetic restraint 216 and the cavity magnetic restraint 224, 226 can be arranged in cooperation with each other so as to produce a force on the flywheel 112 directed towards the central axis 116.

In some examples, the cavity magnetic restraint may include an inner cavity magnetic restraint portion 224 and an outer cavity magnetic restraint portion 226 disposed on opposite cylindrical faces of the cavity 114.

In some further examples, the flywheel magnetic restraint 216 may include an inner flywheel magnetic restraint portion 220 disposed adjacent the inner cavity magnetic restraint portion 224 and an outer flywheel magnetic restraint portion 222 disposed adjacent the outer cavity magnetic restraint portion 226.

The flywheel magnetic restraint 216 may include at least one magnet, where the inner and outer flywheel magnetic restraint portions 220, 222 are opposite magnetic poles of the magnets. Similarly, each of the inner and outer cavity magnetic restraint portions 224, 226 may include at least one magnet having a first pole relatively adjacent a cylindrical cavity wall and a second opposite pole relatively remote from the cavity wall inwardly of the cavity.

In order to ensure that a restraining force directed towards the central axis 116 is produced, the magnetic poles of the flywheel and cavity magnetic restraint portions are disposed and oriented such that the inner flywheel magnetic restraint portion 220 is configured to attract the inner cavity magnetic restraint portion 224, and the outer flywheel magnetic restraint portion 222 is configured to repel the outer cavity magnetic restraint portion 226. In one example, the inner flywheel magnetic restraint portion 220 can be a magnetic south pole and the adjacent face of the inner cavity magnetic restraint portion 224 is a north pole, and both the outer flywheel magnetic restraint portion 222 and the adjacent face of the outer cavity magnetic restraint portion 226 are north poles. However, it will be understood that other configurations are possible.

In some examples, the energy exchange device 230 is adapted to interact with the inner cavity magnetic restraint portion 224, although it will be understood that any suitable energy exchange device is envisaged. In some examples wherein the energy exchange device includes a static homopolar winding, the static homopolar winding is incorporated into the housing and is disposed adjacent the cavity.

In addition to performing the function of restraining the flywheel 112 by exerting an inwardly directed force on the flywheel 112, the magnetic restraint may also serve as a bearing for the flywheel 112.

In this example, the magnets may be neodymium permanent magnets, although it will be understood that any suitable magnet type is envisaged. In addition, instead of permanent magnets, the magnetic restraint may be implemented using electro-magnets.

In some examples, a plurality of magnets may be fixed together in a cylindrical array so as to form the cylindrical flywheel, with the magnets disposed and oriented such that that the required magnetic poles are located outwardly and inwardly of the flywheel. In this example, the magnets can be fixed together using carbon fiber bands 218. For example, upper and lower outer bands may be configured to extend around an outer surface of the flywheel and upper and lower inner bands may be configured to extend around an inner surface of the flywheel. However, it will be understood that any suitable fixing arrangement is envisaged.

In some examples, a cylindrical flywheel of substantially constant wall thickness may be provided. In one example, the inner and outer radii of the flywheel are about 4.48 m and about 4.5 m respectively and the radial thickness of each magnet is about 0.02 m. The magnets in this example may have a generally rectangular shape with dimensions of about 0.1 m wide×0.3 m high, and the total number of magnets required to construct the flywheel is 283.

For a flywheel according to some examples, a speed of rotation of about 600 rpm may be utilized to store about 28.13 kWh of energy. At this speed, the centripetal force on each magnet is about 79,943.8N.

In some examples, the magnets can produce a magnetic field of about 1.4 T, which corresponds to a magnetic pressure of about 779,859.22 Pa on the flywheel, a repulsion force on the outer face of the flywheel of about 23,395.78N, and an attraction force on the inner face of the flywheel of about 23,395.78N. The total inwardly directed force on the flywheel produced by the magnets may therefore be about 46,791.55N.

Consequently, the force on each magnet in excess of the magnetic restraint force may be about 33,152.24N, so it may be necessary to configure the flywheel such that it is capable of withstanding this type of centripetal force during use. In this example, in order to achieve this, the carbon fiber bands may have a radial thickness of about 12.55 mm.

In the following three examples, a number of rectangular permanent or electro-magnets are disposed in a thin walled cylindrical configuration. The magnets are held in position by a band of carbon fiber/epoxy laminate, although any other appropriate mechanism can be utilized to hold the magnets in position.

In a first example, 157 permanent or electro-magnet segments each having dimensions of about 100 mm×200 mm×24.5 mm and a field strength of about 1.5 T are used. The flywheel defines a hoop with a radius of about 2.5 m rotating with an angular velocity of about 1,000 rpm. The flywheel is housed in an evacuated cylindrical tube. The centripetal force on each magnet is about 100,752N, the restraining force provided by the magnets is about 31,194N, and a residual centripetal force of about 69,557N bears on each magnet. The residual force can be restrained with a carbon fibre band (based on a tensile strength of carbon fibre and epoxy laminate 1000 MPa) with dimensions of about 300 mm×4.3 mm. The energy stored in the flywheel of this particular example is about 10 kWhr.

In a second example, 500 permanent or electro-magnet segments each having dimensions of about 100 mm×300 mm×20 mm and field strength of about 1.5 T are used. The flywheel defines a hoop with a radius of about 8 m rotating with an angular velocity of about 480 rpm. The flywheel is housed in an evacuated cylindrical tube. The centripetal force on each magnet is about 90,958N, the restraining force provided by the magnets is about 53,714N, and a residual centripetal force of about 37,243N bears on each magnet. The residual force can be restrained with a carbon fibre band (based on a tensile strength of carbon fibre and epoxy laminate 1000 MPa) with dimensions of about 300 mm×5 mm. The energy stored in the flywheel of this particular example is about 100 kWhr.

In a third example, 1,256 permanent or electro-magnet segments are used. Each segment is about 100 mm×500 mm×25 mm with a field strength of about 1.5 T. The flywheel defines a cylinder with a radius of about 20 m rotating with an angular velocity of about 270 rpm. The flywheel can be housed in an evacuated cylindrical tube. The centripetal force on each magnet is about 149,894N, the restraining force provided by the magnets is about 77,985N, and a residual centripetal force of about 71.908N bears on each magnet. The residual force can be restrained with a carbon fibre band (based on a tensile strength of carbon fibre and epoxy laminate 1,000 MPa) with dimensions of about 500 mm×15 mm. The energy stored in the flywheel of this particular example is about 1,000 kWhr.

While the present examples are described in relation to a flywheel formed of magnets connected together using carbon fiber bands, it will be understood that other arrangements are possible. For example, a plurality of magnets may be disposed on and fixed to a thin cylindrical support in any suitable way such that the required magnetic poles extend outwardly and inwardly of the flywheel, or a single cylindrical magnet may be constructed for the flywheel and/or for each the inner and outer cavity magnetic restraint portions.

Figure 3:
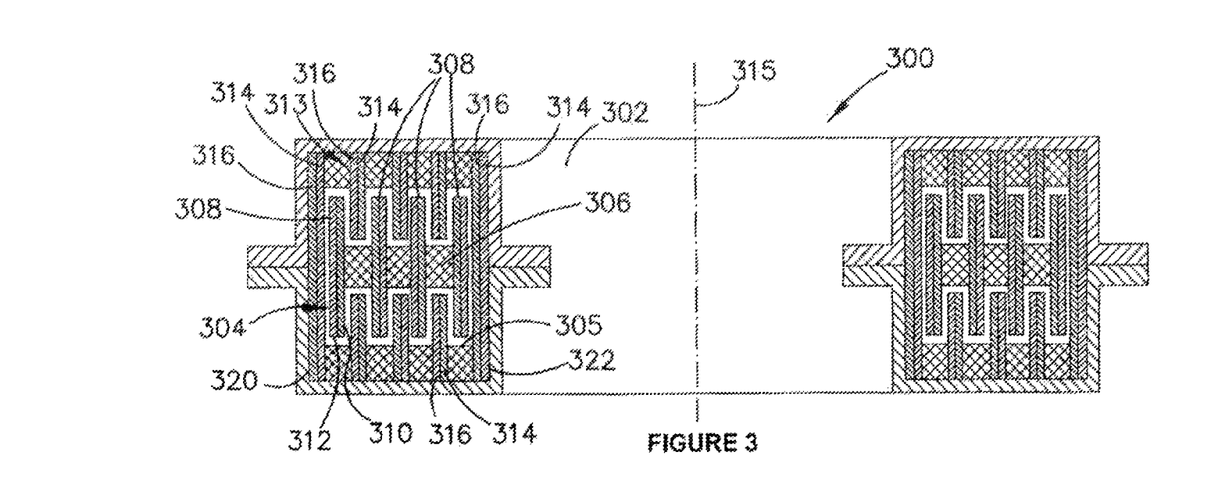
FIG. 3 is a diagrammatic cross-sectional view of another example of an energy storage system.
Figure 4:
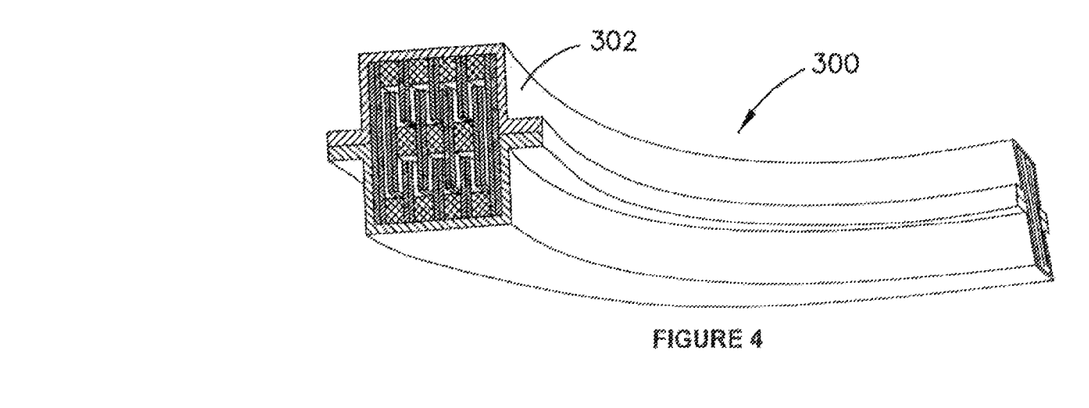
FIG. 4 is a diagrammatic perspective view of part of the energy storage system shown in FIG. 3.

FIG. 3 is a diagrammatic cross-sectional view of another example of an energy storage system 300, and FIG. 4 is a diagrammatic perspective view of part of the energy storage system 300 shown in FIG. 3, all arranged in accordance with at least some embodiments described herein. The example energy storage system 300 is similar to the example energy storage system 100 shown in FIGS. 1 and 2 in that a substantially annular housing 302 is configured to receive a substantially annular flywheel 304 in a substantially annular cavity 305, and the flywheel 304 is rotatable in the cavity 305 about a central axis 314. Unlike the energy storage system 100, the flywheel 304 includes a substantially annular body portion 306 and several substantially cylindrical flywheel portions 308. In some examples, the substantially cylindrical flywheel portions are disposed substantially concentrically relative to each other.

The substantially annular body portion 306 may be formed of carbon fiber material, or any other appropriate material. The substantially cylindrical flywheel portions 308 extend from the body portion 306 and are disposed in a substantially parallel orientation with respect to each other.

Each of the cylindrical flywheel portions 308 may include an inner flywheel magnetic restraint portion 310 and an outer flywheel magnetic restraint portion 312. A cavity magnetic restraint 313 can be interposed between adjacent flywheel portions 308. Each of the cavity magnetic restraints 313 may include an inner cavity magnetic restraint portion 314 and an outer cavity magnetic restraint portion 316. Cavity magnetic restraint portions can also be disposed on inner and outer cylindrical walls 320, 322 respectively of the cavity 305.

As with the examples shown in FIGS. 1 and 2, the inner and outer flywheel and cavity magnetic restraint portions 310, 312, 314, 316 can be arranged and disposed such that like magnetic poles are adjacent each other on an outward side of each flywheel portion 308, and opposite magnetic poles are adjacent each other on an inward side of each flywheel portion 308. As a consequence, a magnetic restraining force may be directed towards the central axis 314 and exerted on the flywheel portions 308.

It will be understood that the magnetic restraint may be constructed in a similar way to the magnetic restraint of the examples shown in FIGS. 1 and 2, or in any other suitable way.

While the present embodiments are described in relation to energy storage systems (e.g., system 300 of FIG. 3) having four (4) cylindrical flywheel portions 308, it will be understood that any number of flywheel portions 308 may be utilized.

It will be appreciated that the magnetic restraining force exerted on the flywheel 304 is dependent on the magnetic field strength of the magnets and area of the flywheel portions 308. Accordingly, for a desired energy storage capacity and associated required flywheel speed, the necessary magnetic restraining force can be achieved by appropriate selection of the number of flywheel portions 308, the type of magnets used, and the flywheel portion area.

Figure 5:
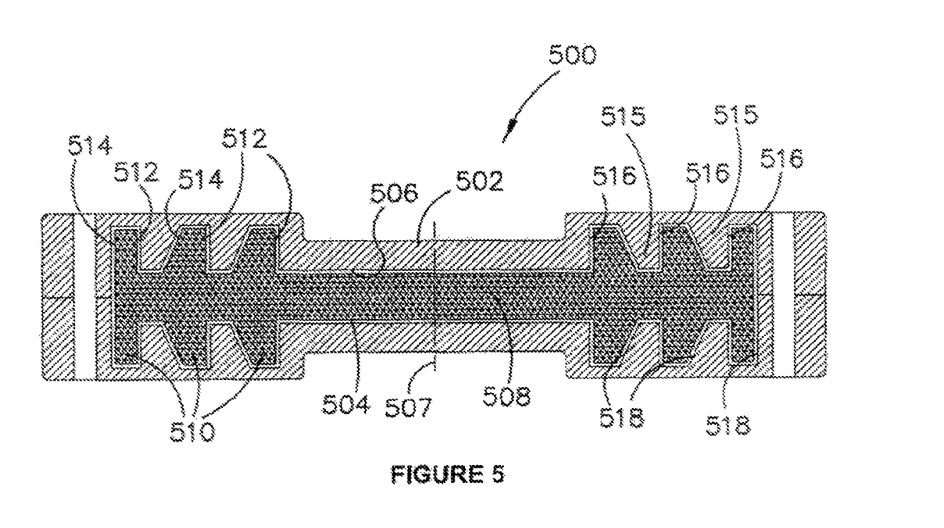
FIG. 5 is a diagrammatic cross-sectional view of another example energy storage system.

FIG. 5 is a diagrammatic cross-sectional view of another example energy storage system 500 that is arranged according to at least some embodiments described herein.

The example energy storage systems 100, 300 shown in FIGS. 1 to 4 have a substantially annular flywheel configured to rotate in a substantially annular cavity. In contrast, the energy storage system 500 shown in FIG. 5 has a disc-like housing 502 arranged to receive a disc-like flywheel 504 in a cavity 506 such that the flywheel 504 is rotatable in the cavity 506 about a central axis 507. The flywheel 504 includes a disc portion 508 and several substantially cylindrical flywheel portions 510. The disc portion 508 of the flywheel 504 may be formed of carbon fiber material, or any other appropriate material. The substantially cylindrical flywheel portions 510 may extend from the disc portion 508 and be disposed in a substantially parallel orientation with respect to each other. The substantially cylindrical flywheel portions 510 may be concentrically disposed relative to the central axis.

Each of the cylindrical flywheel portions 510 may include an inner flywheel surface 512 and an outer flywheel surface 514. The inner flywheel surface 512 includes an associated inner flywheel magnetic restraint portion, and the outer flywheel surface 514 includes an associated outer flywheel magnetic restraint portion. An annular projection 515 can be interposed between adjacent flywheel portions 510. The annular projection 515 can define inner and outer cavity surfaces 516, 518 respectively. The inner cavity surface 516 may include an associated inner cavity magnetic restraint portion, and the outer cavity surface 518 may include an associated outer cavity magnetic restraint portion.

As with the example shown in FIGS. 1 to 4, the inner and outer flywheel and cavity magnetic restraint portions can be arranged and disposed such that like magnetic poles are adjacent each other on an outward side of each flywheel portion 510, and opposite magnetic poles are adjacent each other on an inward side of each flywheel portion 510. As a consequence, a magnetic restraining force can be directed towards the central axis 507 and exerted on the flywheel portions 510.

It will be understood that the magnetic restraint may be constructed in a similar way to the magnetic restraint of the examples shown in FIGS. 1 to 4, or in any other suitable way.

In various examples, at least some of the flywheel surfaces 512, 514 and the cavity surfaces 516, 518 can be inclined relative to the central axis 507. To provide the inclination, at least one flywheel portion may have a thickness that increases in a direction from a rim of the flywheel portion to a central plane substantially perpendicular to the central axis 507 and substantially centrally disposed relative to the flywheel 504. The resulting magnetic restraining force can be exerted on the flywheel 504 and may serve to maintain the flywheel 504 in a generally central area of the cavity portion 506. In this way, the flywheel 504 may be caused to effectively float in the cavity portion 506 suspended by the magnetic field.

In some examples, two flywheel portions can be provided having a first flywheel surface and a second flywheel surface, where the first flywheel surface can be arranged in a substantially parallel orientation with respect to the central axis, and where the second flywheel surface can be configured to taper away from the central axis in a direction away from the rim of the flywheel towards the central plane.

While the present examples are generally described in relation to energy storage systems having a magnetic restraint arranged to act on both internal and external surfaces on a cylindrical portion of a flywheel, it will be understood that other arrangements are possible.

Figure 6:
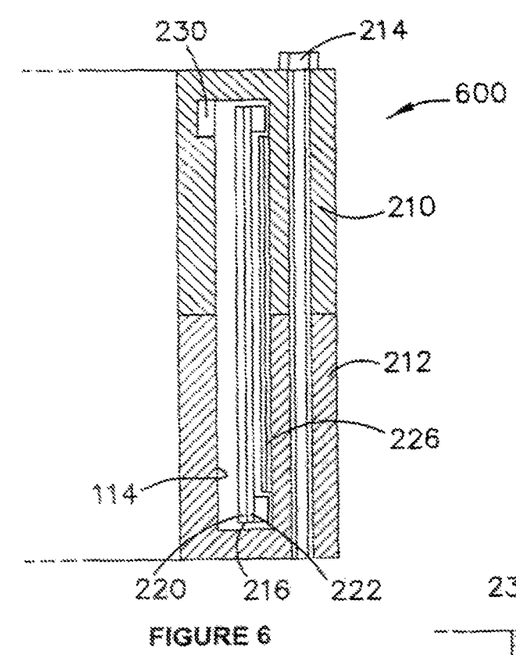
FIG. 6 is a diagrammatic cross-sectional enlarged view of part of another example energy storage system.
Figure 7:
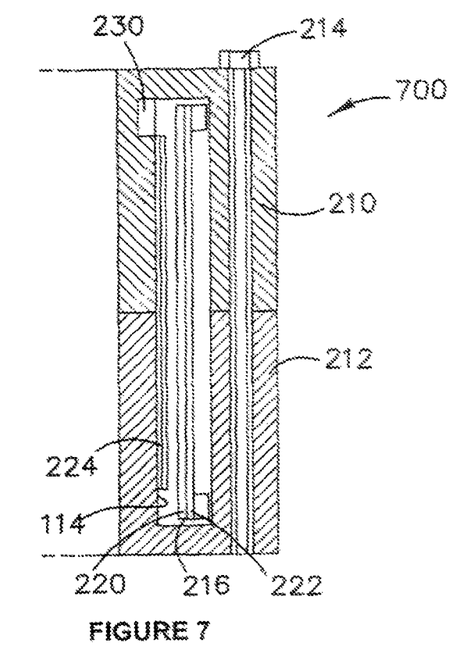
FIG. 7 is a diagrammatic cross-sectional enlarged view of part of another example energy storage system.

For example, as shown in FIGS. 6 and 7, the magnetic restraint may be arranged to act only on an external surface or only on an internal surface of the cylindrical portion. Like and similar features are indicated with like reference numerals. FIG. 6 is a diagrammatic cross-sectional enlarged view of part of an example energy storage system wherein the cavity magnetic restraint includes an inner cavity magnetic restraint 224 but does not include an outer cavity magnetic restraint. FIG. 7 is a diagrammatic cross-sectional enlarged view of part of an example energy storage system wherein the cavity magnetic restraint includes an outer cavity magnetic restraint 226 but does not include an inner cavity magnetic restraint.

Figure 8:
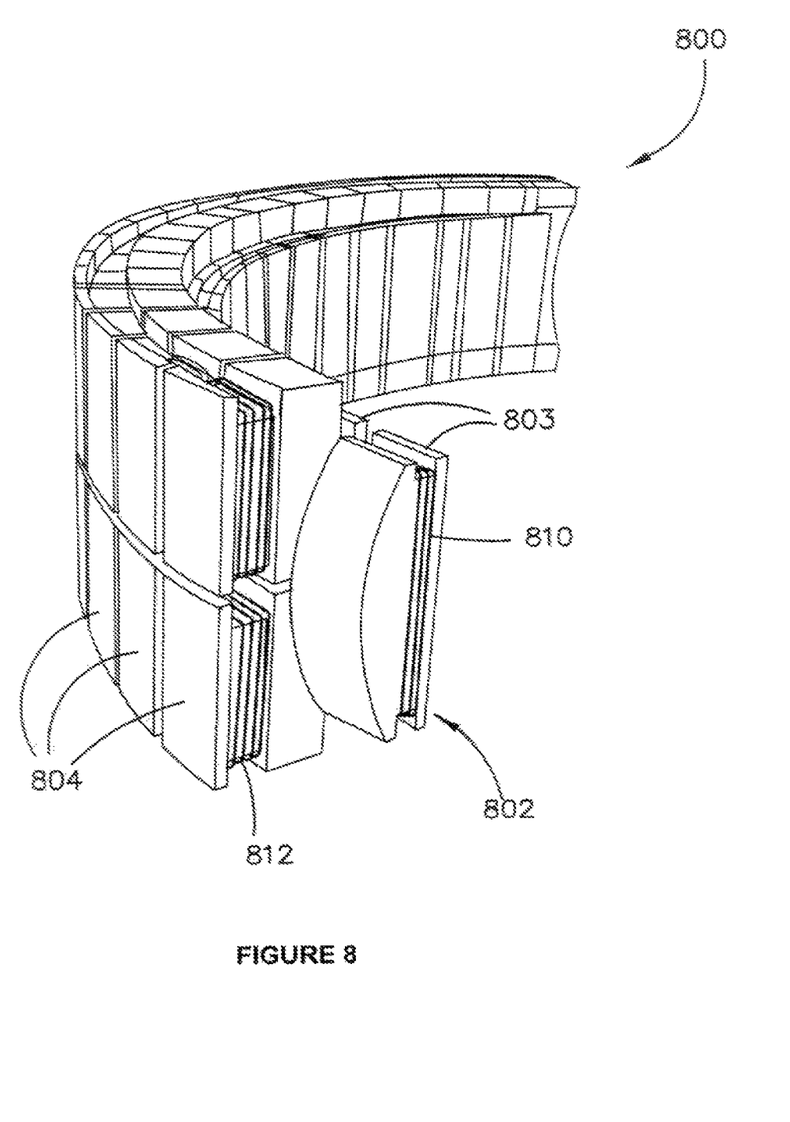
FIG. 8 is a diagrammatic perspective view of part of another example of an energy storage system.
Figure 9:
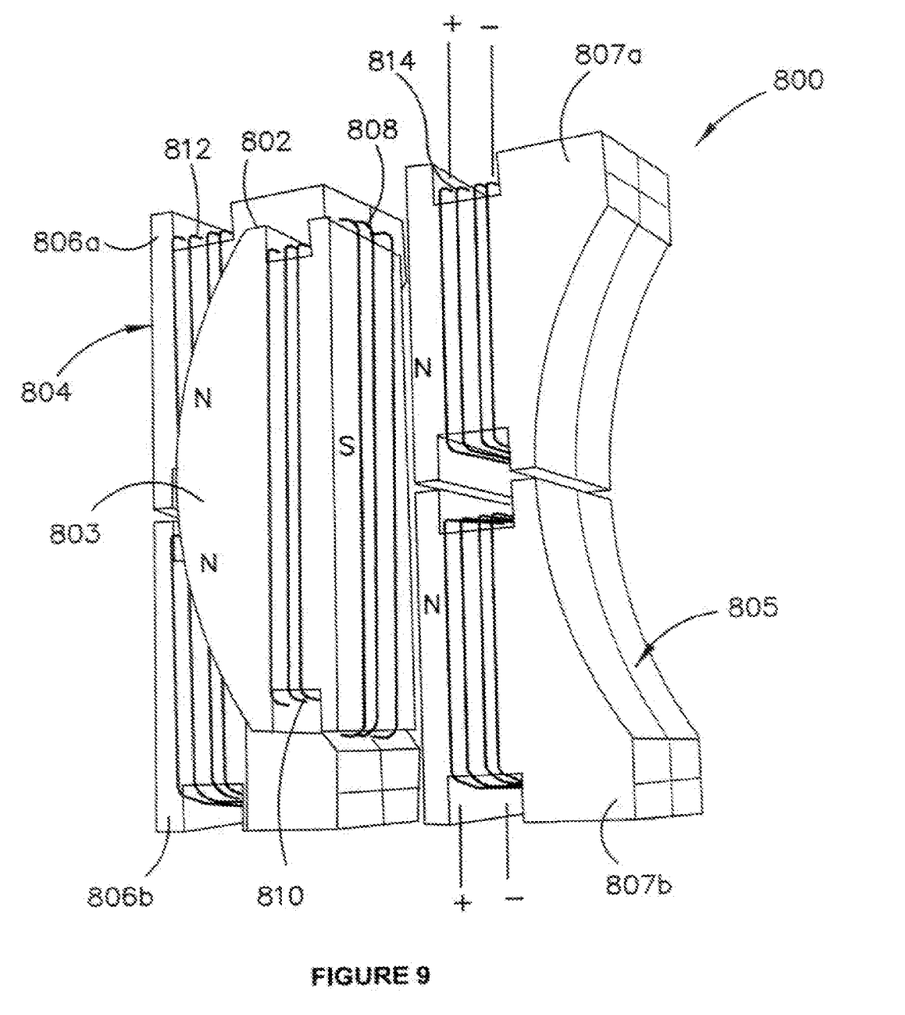
FIG. 9 is a diagrammatic perspective cross-sectional view of the energy storage system shown in FIG. 8.
Figure 10:
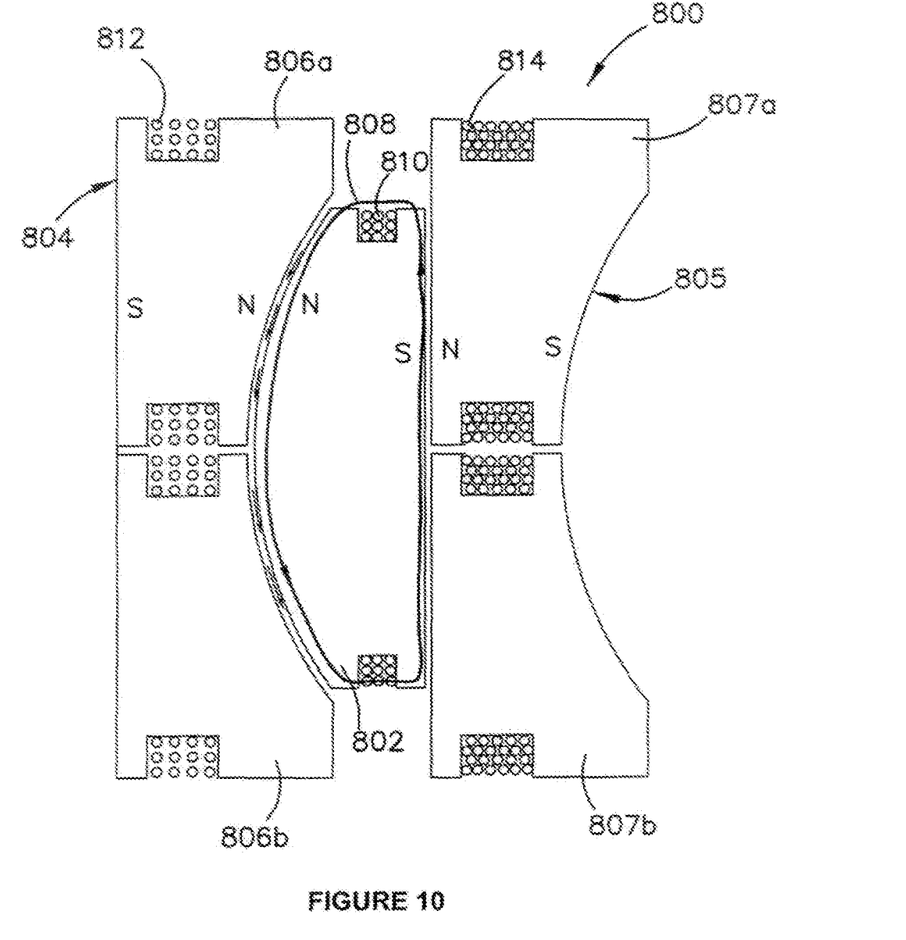
FIG. 10 is a diagrammatic cross-sectional view of the energy storage system shown in FIGS. 8 and 9.

FIGS. 8 to 10 show views of another example energy storage system 800 that is arranged according to at least some embodiments described herein.

The energy storage system 800 includes a magnetic restraint implemented using electro-magnets instead of permanent magnets.

As shown in FIGS. 8 to 10, an annular flywheel 802 can be disposed between and rotates relative to outer and inner annular housing portions. The flywheel 802 may have a plurality of flywheel segments 803. Similarly, the outer housing portion may have a plurality of outer housing segments 804, and the inner housing portion may have a plurality of inner housing segments 805.

In some examples, the adjacently disposed faces of the flywheel segments 803 and the inner housing segments 805 may be generally flat, and the adjacently disposed surfaces of the flywheel segments 803 and the outer housing segments 804 may be generally curved.

As shown in FIGS. 9 and 10, a current generating coil 808 can be wound around each flywheel segment 803 in a generally radial direction, and a magnetizing coil 810 can be wound around each flywheel segment 803 in a generally tangential direction.

Each of the outer and inner housing segments 804, 805 may have two (2) sections 806a, 806b, 807a, 807b that can be coupled together to allow assembly around the flywheel 802. Each housing section 806a, 806b may have a magnetizing coil 812 that can be wound in a generally tangential direction. Similarly, each housing section 807a, 807b may have a magnetizing coil 814 that can be wound in a generally tangential direction.

In operation, each of the magnetizing coils 812 of the outer housing segments 804 may produce a magnetic pole of a first polarity adjacent the flywheel 802. Similarly, each of the magnetizing coils 814 of the inner housing segments 805 may produce a magnetic pole of the first polarity adjacent the flywheel 802. The magnetizing coils 814 of the inner housing segments 805 may generate magnetic flux that cuts through the current generating coil 808 of the flywheel 802. In contrast, since like poles can be disposed next to each other between the flywheel 802 and the outer housing segments 804, substantially no flux cuts through the current generating coil 808. Instead, magnetic flux generally follows the gap between the flywheel 802 and the outer housing segments 804. As a consequence, a current is induced in the current generating coil 808 that for example can be directed to the magnetizing winding 810 of the flywheel.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system, comprising:
   a flywheel that comprises a body portion and at least a first flywheel portion and a second flywheel portion that extend from the body portion, wherein at least a portion of the body portion is interposed between the first flywheel portion and the second flywheel portion;
   a housing that defines a cavity configured to receive at least the first flywheel portion and the second flywheel portion, wherein the housing and the flywheel are configured in cooperation and the flywheel is rotatable in the cavity about a central axis of the flywheel;
   an energy exchange device arranged to convert between electrical energy and kinetic energy associated with rotation of the flywheel; and
   a magnetic restraint arranged to exert a magnetic restraining force on the flywheel in a direction towards the central axis.

2. The system of claim 1, wherein the magnetic restraint comprises a flywheel magnetic restraint disposed on the flywheel and a cavity magnetic restraint disposed on the cavity, wherein the flywheel magnetic restraint is operatively associated with the cavity magnetic restraint and a magnetic restraining force is exerted on the flywheel in the direction towards the central axis.

3. The system of claim 2, wherein:
   the cavity comprises a first cavity surface and a second cavity surface, the first cavity surface is positioned to face towards the second cavity surface, and a distance between the first cavity surface and the central axis is less than a distance between the second cavity surface and the central axis;
   the first flywheel portion comprises a first flywheel surface and a second flywheel surface, the first flywheel surface is positioned to face away from the second flywheel surface, and a distance between the first flywheel surface and the central axis is less than a distance between the second flywheel surface and the central axis; and
   the first cavity surface is disposed adjacent to the first flywheel surface, and the second cavity surface is disposed adjacent to the second flywheel surface.

4. The system of claim 3, wherein the flywheel magnetic restraint comprises an inner flywheel magnetic restraint portion that is associated with the first flywheel surface, and the inner flywheel magnetic restraint portion is of a first magnetic polarity; and
   wherein the cavity magnetic restraint comprises an inner cavity magnetic restraint portion that is associated with the first cavity surface, and the inner cavity magnetic restraint portion is of a second magnetic polarity that is opposite the first magnetic polarity.

5. The system of claim 3, wherein:
   the flywheel magnetic restraint comprises an outer flywheel magnetic restraint portion that is associated with the second flywheel surface;
   the cavity magnetic restraint comprises an outer cavity magnetic restraint portion that is associated with the second cavity surface; and
   respective magnetic polarities of the outer flywheel magnetic restraint portion and the outer cavity magnetic restraint portion are a same magnetic polarity.

6. The system of claim 2, wherein the magnetic restraint is arranged to operate as a bearing.

7. The system of claim 1, wherein the magnetic restraint comprises a plurality of permanent magnets respectively disposed on at least the first flywheel portion, the second flywheel portion, and a wall of the cavity.

8. The system of claim 7, wherein one or more of the plurality of permanent magnets comprise neodymium magnetic material.

9. The system of claim 1, wherein the magnetic restraint comprises a plurality of electro-magnets respectively disposed on the first flywheel portion, the second flywheel portion, and the cavity.

10. The system of claim 9, further comprising at least one flywheel magnetizing coil wound in a substantially tangential direction, and at least one housing magnetizing coil wound in the substantially tangential direction.

11. The system of claim 10, wherein the housing comprises an inner housing portion and an outer housing portion, and the system comprises an outer housing magnetizing coil wound in the substantially tangential direction on the outer housing portion, and an inner housing magnetizing coil wound in the substantially tangential direction on the inner housing portion, wherein the flywheel magnetizing coil, the inner housing magnetizing coil, and the outer housing magnetizing coil are wound based on a first magnetic configuration between the flywheel and the outer housing portion, and wherein the flywheel magnetizing coil, the inner housing magnetizing coil, and the outer housing magnetizing coil are wound based on a second magnetic configuration between the flywheel and the inner housing portion.

12. The system of claim 9, wherein adjacently disposed surfaces of the flywheel and the inner housing portion are substantially flat, and other adjacently disposed surfaces of the flywheel and the outer housing portion are curved.

13. The system of claim 1, wherein the flywheel is substantially annular.

14. The system of claim 1, wherein the housing is substantially annular.

15. The system of claim 1, wherein the first flywheel portion and the second flywheel portion are substantially cylindrical.

16. The system of claim 1, wherein the flywheel comprises a disc portion and at least one substantially cylindrical flywheel portion, wherein the disc portion is rotatable about the central axis, and wherein the at least one substantially cylindrical flywheel portion is substantially concentrically disposed relative to the central axis.

17. The system of claim 1, wherein the first flywheel portion and the second flywheel portion comprise respective substantially constant thicknesses.

18. The system of claim 1, wherein the first flywheel portion comprises a thickness that increases in a direction from a rim of the first flywheel portion to a central plane substantially perpendicular to the central axis and substantially centrally disposed relative to the flywheel.

19. The system of claim 3, wherein the first flywheel surface is arranged in a substantially parallel orientation with respect to the central axis, and wherein the second flywheel surface is configured to taper away from the central axis in a direction away from a rim of the flywheel towards a central plane substantially perpendicular to the central axis and substantially centrally disposed relative to the flywheel.

20. The system of claim 1, wherein the energy exchange device comprises a static homopolar winding.

21. The system of claim 3, wherein a static homopolar winding of the energy exchange device is incorporated into the housing and is disposed adjacent the first cavity surface.

22. The system of claim 1, wherein the flywheel comprises a plurality of substantially cylindrical flywheel portions disposed substantially concentrically relative to each other.

23. The system of claim 1, wherein the housing comprises two housing sections, wherein the two housing sections are arranged to receive the flywheel when the two housing sections are decoupled from one another, and wherein the two housing sections define a cavity that rotatably receives the flywheel and confines the flywheel when the housing sections are coupled to one another.

24. The system of claim 1, wherein the cavity comprises a substantial vacuum.

25. The system of claim 1, wherein the flywheel is at least partially formed of carbon fiber material.

26. The system of claim 1, wherein the flywheel comprises at least one restraining band arranged to mechanically restrain at least the first flywheel portion.

27. An apparatus, comprising:
means for rotating a flywheel in a cavity about a central axis of the flywheel, the flywheel comprising a body portion located between a first flywheel portion and a second flywheel portion that extend from the body portion;
means for converting between electrical energy and kinetic energy associated with rotation of the flywheel; and
means for exerting a magnetic restraining force on the flywheel in a direction towards the central axis.

28. A method, comprising:
receiving a flywheel in a cavity defined by a housing and rotating the flywheel in the cavity about a central axis of the flywheel, wherein the flywheel comprises a body portion configured between a flywheel portion and another flywheel portion that extend from the body portion;
converting between electrical energy and kinetic energy associated with rotation of the flywheel; and
exerting a magnetic restraining force on the flywheel in a direction towards the central axis to restrain a movement of the flywheel.

* * * * *

UNITED STATES PATENT AND TRADEMARK OFFICE
CERTIFICATE OF CORRECTION

Page 1 of 1

| | |
|---|---|
| PATENT NO. | : 8,946,958 B2 |
| APPLICATION NO. | : 13/321784 |
| DATED | : February 3, 2015 |
| INVENTOR(S) | : Roberts |

It is certified that error appears in the above-identified patent and that said Letters Patent is hereby corrected as shown below:

In the Specification

In Column 1, Line 1, delete "US national stage application" and
insert -- US national stage application filing under 35 U.S.C. §371 --, therefor.

In Column 1, Line 49, delete "drawings" and insert -- drawings: --, therefor.

In Column 4, Line 59, delete "kWhr." and insert -- kWh. --, therefor.

In Column 5, Line 6, delete "kWhr." and insert -- kWh. --, therefor.

In Column 5, Line 21, delete "kWhr." and insert -- kWh. --, therefor.

Signed and Sealed this
Thirtieth Day of June, 2015

Michelle K. Lee
*Director of the United States Patent and Trademark Office*